US 10,233,839 B2

United States Patent
Benignos

(10) Patent No.: US 10,233,839 B2
(45) Date of Patent: Mar. 19, 2019

(54) COMPOSITE HEAT EXCHANGER

(71) Applicant: General Electric Company, Schenectady, NY (US)

(72) Inventor: Jorge Carretero Benignos, Garching b. Munchen (DE)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1568 days.

(21) Appl. No.: 13/904,740

(22) Filed: Aug. 16, 2013

(65) Prior Publication Data

US 2015/0047367 A1 Feb. 19, 2015

(51) Int. Cl.
*F02C 7/143* (2006.01)
*F28F 3/04* (2006.01)
*F28F 21/06* (2006.01)
*F28D 9/00* (2006.01)
*F28D 21/00* (2006.01)

(52) U.S. Cl.
CPC ............ *F02C 7/143* (2013.01); *F28D 9/0018* (2013.01); *F28D 9/0037* (2013.01); *F28F 3/046* (2013.01); *F28F 21/065* (2013.01); F05D 2260/213 (2013.01); F28D 2021/0021 (2013.01); Y02T 50/672 (2013.01); Y02T 50/675 (2013.01)

(58) Field of Classification Search
CPC .. F02C 6/08; F02C 7/141; F02C 7/143; F02C 7/18; F02C 7/185; F05D 2260/221; F05D 2260/211; F05D 2300/43; F05D 2300/502; F05D 2260/213; Y02T 50/675; Y02T 50/672; F28F 3/046; F28F 3/12; F28F 3/14; F28F 5/02

USPC .................... 60/782; 165/8, 85–90, 120, 133
See application file for complete search history.

(56) References Cited

U.S. PATENT DOCUMENTS

| 5,114,776 A | 5/1992 | Cesaroni |
| 5,733,390 A | 3/1998 | Kingston |
| 6,059,024 A | 5/2000 | Ramshaw et al. |
| 7,331,381 B2 | 2/2008 | Wang et al. |

(Continued)

FOREIGN PATENT DOCUMENTS

CN 202304545 U 7/2012

OTHER PUBLICATIONS

Sheppard, "Geopolymer Composites: A Ceramics Alternative to Polymer Matrices", Composites/Plastics.

*Primary Examiner* — Adam Waggenspack
(74) *Attorney, Agent, or Firm* — GE Global Patent Operation; John Darling

(57) ABSTRACT

A heat exchanger assembly in one embodiment includes an inlet, an outlet, and a core. The inlet is configured to accept a fluid to be cooled and the outlet is configured to provide an exit for a flow of the fluid that has been cooled. The core includes at least one passageway formed therein configured for passage of the fluid to be cooled from the inlet to the outlet. The core also includes a receiving surface configured to receive a cooling flow therethrough. The core is configured to direct the cooling flow to pass by at least a portion of the at least one passageway to cool the fluid. The core is comprised of a high temperature geopolymer composite material. The composite material may be configured for use at temperatures above about 300 degrees Celsius, and may have a thermal conductivity below about 20 Watts/ (meter*degree Kelvin).

17 Claims, 4 Drawing Sheets

(56) References Cited

U.S. PATENT DOCUMENTS

| | | | |
|---|---|---|---|
| 7,716,913 B2* | 5/2010 | Rolt | B64D 33/08 |
| | | | 60/226.1 |
| 7,745,363 B2 | 6/2010 | Beall et al. | |
| 8,042,607 B2 | 10/2011 | Pfitzer et al. | |
| 2010/0194179 A1* | 8/2010 | Waltz | B60T 5/00 |
| | | | 301/6.91 |
| 2010/0236759 A1 | 9/2010 | Wadley et al. | |
| 2014/0300030 A1* | 10/2014 | Tethal | C04B 41/88 |
| | | | 264/219 |
| 2016/0123230 A1* | 5/2016 | Thomas | F28D 1/0358 |
| | | | 60/772 |

* cited by examiner

COMPOSITE HEAT EXCHANGER

BACKGROUND

Heat exchangers may be employed in various applications to exchange heat between two fluids. For example, a first fluid at a higher temperature may be passed through a first passageway, while a second fluid at a lower temperature may be passed through a second passageway. The first and second passageways may be in contact or close proximity, allowing heat from the first fluid to be passed to the second fluid. Thus, the temperature of the first fluid may be decreased and the temperature of the second fluid may be increased.

Heat exchangers may be employed in conjunction with gas turbine engines. For example, to improve operating efficiency, heat from one portion of a gas turbine may be transferred to another portion of the gas turbine. As another example, heat from one portion of a gas turbine may be transferred outside of the gas turbine, allowing cooling of a portion of gas turbine (or cooling of a flow within the turbine).

Gas turbines may be utilized in challenging design environments. For example, gas turbines may be employed for propulsion in aircraft. Such an environment may provide a number of challenges to the design of and/or materials used for heat exchangers. For example, high temperatures (e.g., about 300 degrees Celsius or higher) may be encountered in such environments. Also, low weight constraints may be present in such environments. Further still, the amount of drag permitted through one or more passages of a heat exchanger may be limited in such environments.

Conventionally, heat exchangers use metals (e.g., copper, aluminum, or the like) for improved heat transfer due to the relatively high thermal conductivity of metals. However, various metals may be inappropriate for certain applications due to cost, presence of high temperatures, weight requirements, or the like. For example, Aluminum is a generally good thermal conductor and relatively lightweight, but may be inappropriate for operating environments having high temperatures, for example about 300 degrees Celsius or above, as Aluminum loses strength at higher temperatures and may have inadequate strength for applications having operating temperatures of about 300 degrees Celsius or above. Other metals, or other materials with relatively high thermal conductivity may be expensive to obtain and/or form. Further, other metals or materials may weigh more than desired for applications where weight is at a premium.

BRIEF DESCRIPTION

In one embodiment, a heat exchanger assembly is provided. The heat exchanger assembly includes an inlet, an outlet, and a core. The inlet is configured to accept a fluid to be cooled and the outlet is configured to provide an exit for a flow of the fluid that has been cooled. The core includes at least one passageway formed therein configured for passage of the fluid to be cooled from the inlet to the outlet. The core also includes a receiving surface configured to receive a cooling flow therethrough. The core is configured to direct the cooling flow to pass by at least a portion of the at least one passageway to cool the fluid. The core is comprised of a high temperature geopolymer composite material configured for use at temperatures above about 300 degrees Celsius and having a thermal conductivity below about 20 Watts/(meter*degree Kelvin).

In another embodiment, an assembly for a turbofan includes a first compressor, an intercooler, and a second compressor. The first compressor is configured to receive a first intake airflow and to provide a first exit airflow at a higher pressure than the first intake airflow. The intercooler is disposed downstream of the first compressor and is configured to receive the first exit airflow and to cool the first exit airflow to provide a cooled airflow. The intercooler includes an inlet, an outlet, and a core. The inlet is configured to accept a fluid to be cooled and the outlet is configured to provide an exit for a flow of the fluid that has been cooled. The core includes at least one passageway and a receiving surface. The least one passageway is formed in the core and configured for passage of the fluid to be cooled from the inlet to the outlet. The cooling surface is cooling surface configured to receive a cooling flow therethrough, and the core is configured to direct the cooling flow to pass by at least a portion of the at least one passageway to cool the fluid. The core is comprised of a high temperature geopolymer composite material configured for use at temperatures above about 300 degrees Celsius, with the high temperature composite material having a thermal conductivity below about 20 Watts/(meter*degree Kelvin). The second compressor is configured to receive the cooled airflow from the intercooler and to provide a second exit airflow at a higher pressure than the cooled airflow.

In another embodiment, a method of providing a heat exchanger assembly is provided. The method includes providing a core that includes at least one passageway formed therein and a cooling surface. The cooling surface is configured to receive a cooling flow therethrough. The core is configured to direct the cooling flow to pass by at least a portion of the at least one passageway to cool a fluid passing through the at least one passageway. The core is comprised of a high temperature geopolymer composite material that is configured for use at temperatures above about 300 degrees Celsius and has a thermal conductivity below about 20 Watts/(meter*degree Kelvin). The method also includes providing an inlet in fluid communication with the at least one passageway. The inlet is configured to accept the fluid to be cooled. Further, the method includes providing an outlet in fluid communication with at least one passageway of the core. The outlet is configured to provide an exit for a flow of the fluid that has been cooled.

DETAILED DESCRIPTION

Figure 1:
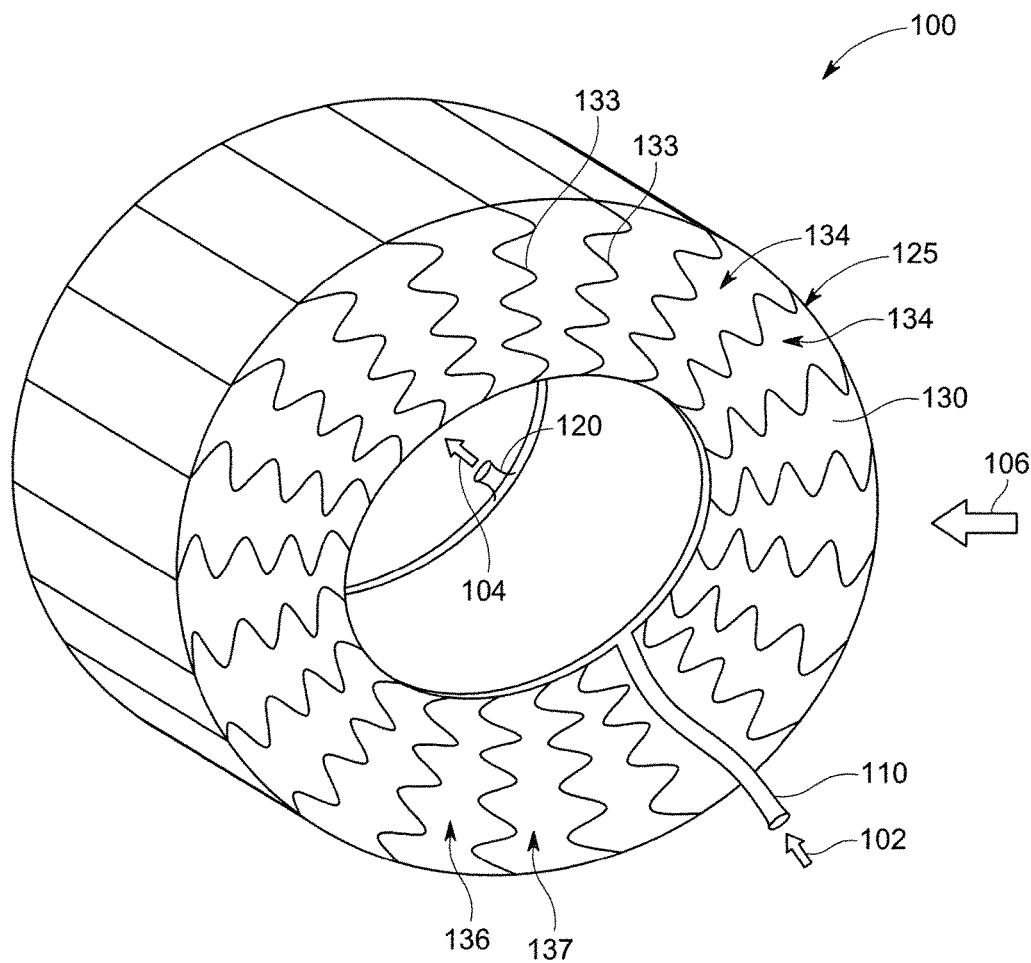
FIG. 1 is a schematic view of a heat exchanger assembly in accordance with various embodiments.

Various embodiments will be better understood when read in conjunction with the appended drawings. To the extent that the figures illustrate diagrams of the functional blocks of various embodiments, the functional blocks are not necessarily indicative of the division between hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide for high temperature and/or lightweight composite heat exchangers. For example, various embodiments provide lightweight geopolymer composite heat exchangers configured to operate in environments having a temperature of about 300 degrees Celsius or higher, for example in conjunction with inter-cooling applications in advanced aircraft engine thermodynamic cycles. In some embodiments, a non-organic geopolymer, such as polysialate, may be utilized. For example, a heat exchanger may be made of a non-organic geopolymer resin reinforced with carbon fibers, with the heat exchanger made using readily available commercial techniques such as prepreg, vacuum bag, or the like. Such non-organic polymer based composites, for example, may be able to withstand temperatures in excess of about 300 degrees Celsius and/or pressures in excess of about 8 bar. In various embodiments, the heat exchanger may be configured with a primary surface type geometry, such as corrugated, cross-corrugated, or the like. The primary surface geometry may be configured to alleviate or minimize any potential issues regarding low through-plane thermal conductivity of the composite. Corrugations in various embodiments may be configured to stimulate heat transfer while still avoiding high through-flow pressure losses. In various embodiments, materials used to make a heat exchanger (e.g., geopolymer based resin paired with carbon fibers) may be amenable to commercially available composite manufacturing techniques and/or may be relatively inexpensive.

At least one technical effect of various embodiments is the provision of a heat exchanger assembly for use in high temperature applications (e.g., above about 300 degrees Celsius). At least one technical effect of various embodiments provides for lightweight heat exchanger assemblies. At least one technical effect of various embodiments is improved weight and/or temperature characteristics of heat exchangers configured for air-to-air heat exchange. At least one technical effect of various embodiments is improved heat exchangers for use in aircraft turbofan engines, for example in conjunction with intercooling between compressors.

FIG. 1 illustrates a heat exchanger assembly 100 formed in accordance with various embodiments. The heat exchanger assembly 100 is configured to accept an inlet flow 102 of a first fluid, and to provide an outlet flow 104 of the first fluid. As the first fluid passes through the heat exchanger assembly 100, the first fluid is cooled using a cooling flow 106 of a second fluid that is passed through at least a portion of the heat exchanger assembly 100. In various embodiments, both the first and second fluids may be air, and the heat exchanger assembly 100 may be configured as an air-to-air heat exchanger. For example, the heat exchanger assembly 100 may be utilized as an intercooler disposed between two compressors in a turbofan engine. The inlet flow 102 may be provided by a first compressor, and the outlet flow 104 may in turn be provided to a second compressor disposed downstream of the first compressor. In various embodiments, the cooling flow 106 may be provided from a bypass flow of air from the turbofan. The heat exchanger assembly 100 in various embodiments may be configured for a variety of applications. In the context of an aircraft, for example, the heat exchanger assembly 100 may be configured as a pre-cooler, an intercooler, a recuperator, or the like. In the illustrated embodiment, the heat exchanger assembly 100 is configured as a ring-shaped or annular heat exchanger. In various embodiments, an annular heat exchanger may be disposed radially about a shaft, for example a shaft of a turbofan. The annular portion may be disposed for example, in a position to receive a bypass flow of air. The configuration shown in FIG. 1 is intended to be generally schematic in nature and by way of example and not limitation. Other shapes or configurations of heat exchanger may be employed in various alternate embodiments.

In the illustrated embodiment, the heat exchanger assembly 100 includes an inlet 110, an outlet 120, a core 125, and a receiving (or cooling) surface 130. Generally, in various embodiments, a flow of a fluid to be cooled (e.g., the inlet flow 104) is directed through the core 125 of the heat exchanger assembly via the inlet 110. As the fluid to be cooled passes through the core 125, air from the cooling flow 106 is directed through the core via the receiving surface 130. The fluid to be cooled may be directed through a first group of passages of the core 125, while the air from the cooling flow 106 may be directed through a second group of passages of the core 125. The first group of passages and the second group of passages may be arranged so that heat from the fluid to be cooled in the first group of passages may be transferred to the cooling flow 106 passing through the second group of passages. For example, the first and second groups of passages may be arranged in a grid or other arrangement that provides an alternating arrangement of the first and second groups of passages. In various embodiments, each of the passages of the first group of passages may be positioned adjacently to at least one of the passages of the second group of passages. The cooling flow 106 proceeds out of the back (or other) side of the core 125, while the fluid to be cooled exits the core 125 via the outlet 120. In the illustrated embodiment, the receiving surface 130 is shown having an annular (e.g., doughnut-shaped) shape, and may be disposed radially about a shaft. Other shapes or configurations of receiving surface 130 may be employed in various alternate embodiments, including circular, oval, square, rectangular, or other geometric shapes, among others. Different types or arrangements of passageways (e.g., tubes) and/or heat exchangers may be employed in various embodiments.

In the illustrated embodiment, the inlet 110 is configured to accept a fluid to be cooled. In the depicted embodiment, the inlet 110 accepts the inlet flow 102. Further, the heat exchanger assembly 100 depicted in FIG. 1 is configured as an air-to-air heat exchanger, and the fluid to be cooled may be understood as a first air stream from a first source at a first temperature, while the cooling flow 106 may be understood as a second air stream from a second source at a second temperature that is lower than the first temperature. For example, the inlet flow 102 may be received or accepted via ducting, hosing, conduits, or the like from a compressor positioned upstream of the heat exchanger assembly 100. Other arrangements may be utilized in various embodiments. For example, the inlet 110 may receive air from a source other than a compressor, such as in various embodiments where the heat exchanger assembly 100 is configured as a recuperator that receives an air flow from an exhaust stream. In various embodiments, the inlet 110 may be configured to receive a liquid, such as oil. For example, the heat exchanger assembly 110 may be configured as an air-cooled oil cooler.

Generally, in various embodiments, the outlet 120 is configured to provide an exit for a flow of a fluid that has been received at the inlet 110 and cooled during passage through the core 125. In the depicted embodiment, the exit flow 104 leaves the heat exchanger assembly 100 via the outlet 120. For example, in various embodiments, the exit flow 104 may be provided via the outlet 120 to a compressor located downstream of the heat exchanger assembly 100 via ducting, hosing, conduits, or the like. Other arrangements may be utilized in various embodiments.

In the illustrated embodiment, the core 125 is configured to receive a flow of a first fluid to be cooled (e.g., the inlet flow 102), to cool the fluid to be cooled during passage through the core 125 using a cooling flow of a second fluid (e.g., the cooling flow 106) to provide a cooled flow of the first fluid via the outlet 120 (e.g., the exit flow 104). In some embodiments, the first and second fluids may be substantially the same, while in other embodiments, the first and second fluids may be different. For example, in the illustrated embodiment, the first and second fluids may both be air. In various embodiments, as just one additional example, the first fluid may be a liquid such as oil, and the second fluid may be air. In various embodiments, the core 125 is made from high temperature composite material configured for use at high temperatures, for example temperatures above about 300 degrees Celsius. Further, the core 125 may be made from a high temperature composite material having a relatively low thermal conductivity, for example a thermal conductivity below about 20 Watts/(meter*degree Kelvin).

In various embodiments, the core 125 includes at least one passageway formed in the core 125 for the passage of the fluid to be cooled from the inlet 110 to the outlet 120. The core 125 also includes the receiving surface 130, which is oriented toward the cooling flow 106 and configured to receive the cooling flow 106, with the cooling flow 106 passing through at least a portion of the core 125. Further, the core 125 is configured to direct the cooling flow 106 to pass by at least a portion of at least one passageway to cool the fluid passing from the inlet 110 to the outlet 120 via the passageway.

Thus, the receiving surface 130 may be understood as being porous, in that the receiving surface 130 is configured to allow the passage of air through at least a portion of the receiving surface 130 and the core 125. For example, the receiving surface 130 may be formed with the ends or edges of bent or otherwise formed sheets or plates joined together to define openings along the length of the sheets or plates. The particular size, shape, and/or quantity of openings may be selected based on performance desired for particular applications (e.g., based on one or more of quantity of fluid to be cooled, quantity of cooling flow available, properties of the cooling fluid and/or fluid to be cooled, space available, material(s) used, permissible amount of drag on the cooling flow, amount of cooling to be provided, or the like). In the illustrated embodiment, the core 125 includes plural sheets 133 extending across a width of the core 125, with the sheets 133 corrugated or otherwise bent to form channels 134. In various embodiments, the sheets 133 may be cross-corrugated. A first group of the channels 134 are in fluid communication with the inlet 110 and the outlet 120. The first group of the channels 134 may be understood as forming at least one passageway for the fluid to be cooled to flow through. The first group of channels 134 may be configured for fluid communication with the inlet 110 and/or outlet 120 via one or more headers, ports, or the like. A second group of the channels 134 in the depicted embodiments are in fluid communication with the receiving surface 130 and configured to allow passage of the cooling flow 106 therethrough. The flow through the respective first and second groups of channels 134 may be maintained separately by seals, gaskets, or the like.

Generally, in various embodiments, the channels 134 may be arranged such that alternating or adjacent channels are in different groups of the channels 134. For example, a first channel 136 may be in fluid communication with the inlet 110 and outlet 120, while an adjacent second channel 137 may be in fluid communication with the receiving surface 130. Thus, the portion of the cooling air flow 106 passing through the second channel 137 may pass by (e.g., pass along an adjacent passageway or otherwise in thermal communication therewith) the flow through the first channel 136, allowing the cooling air flow 106 to cool the fluid passing from the inlet 110 and the outlet 120. Thus, one or more of the channels 134 may be open to the passage therethrough of the cooling flow 106, may receive cooling air (or other fluid) impinging on the receiving surface 130, and allow the cooling air (or other fluid) to pass through to cool fluid in other channels 134. The particular arrangement of the channels 134 may be determined based on, for example, one or more of a permissible amount of drag on the cooling flow 106 through the core 125, structural requirements, an amount of heat exchange desired (e.g., an amount of cooling flow 106 desired), among others.

Figure 2:
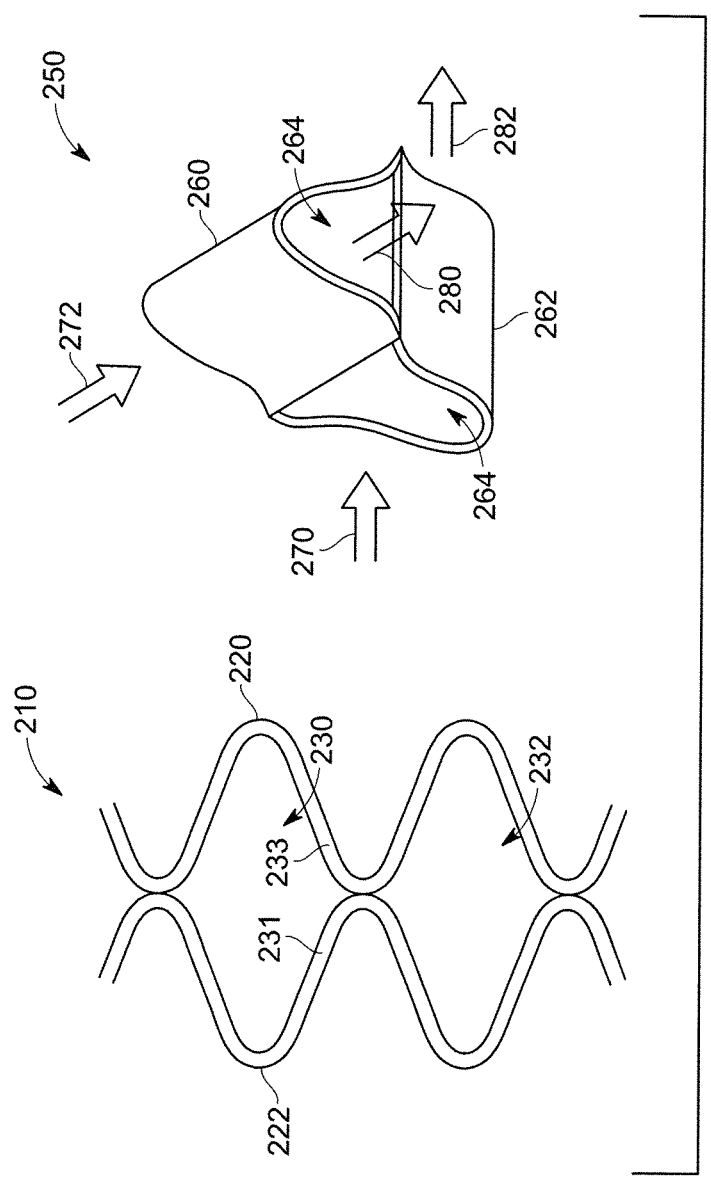
FIG. 2 is a view of passageways formed by corrugations in accordance with various embodiments.

FIG. 2 shows passageways formed by corrugations in core assemblies 210, 250 formed in accordance with various embodiments. The core assembly 210 depicts a corrugated assembly, and the core assembly 250 depicts a cross-corrugated assembly. Generally, in the core assemblies 210, 250, corrugated or otherwise bent sheets are joined to form openings. Plural sheets may be aligned to form a core having plural pathways passing therethrough. The cores formed from the plural sheets may then be configured such that some of the passageways are in fluid communication with an inlet and outlet and others of the passageways are in fluid communication with a receiving surface to receive a cooling flow as discussed herein.

The core assembly 210 includes a first corrugated sheet 220 and a second corrugated sheet 222 joined to form a portion of a core. Corrugations, bends, or other shapes in the first corrugated sheet 220 and the second corrugated sheet 222 are configured to form passageways. As seen in FIG. 2, the sheets and corresponding passageways extend into (and/or out of) the page. The first corrugated sheet 220 and the second corrugated sheet 222 cooperate to form passageways, including a first passageway 230 and a second passageway 232. Additional sheets and passageways are omitted from FIG. 2 for the sake of simplicity and clarity. It should be noted that various embodiments may include additional sheets and passageways as appropriate. As seen in FIG. 2, the first passageway 220 and the second passageway 222 are adjacent. Thus, a fluid passing through the first passageway 220 may exchange heat with the second passageway 222 (and/or other adjacent or adjoining passageways) via conduction through the walls 231, 233 of the corrugated sheets. In various embodiments, the first passageway 230 may be configured in fluid communication with an inlet that accepts a fluid to be cooled, and the second passageway 232 may be configured in fluid communication with a cooling flow. A cooling flow may thus pass through the second passageway 232 to accept heat (e.g., via conduction through the walls 231, 233) from a fluid passing through the first passageway 230. In other embodiments, the first passageway 230 and adjacent second passageway 232 may be understood as forming a portion of a row of passageways. Each passageway in the row may receive the fluid to be cooled, while each passageway in an adjacent row may receive the cooling fluid.

As indicated herein, the core assembly 250 depicts a cross-corrugation arrangement. The core assembly 250 includes a first corrugated sheet 260 and a second corrugated sheet 262. The first and second corrugated sheets 260, 262 are mounted at 90 degrees as defined by axes passing along the lengths of the corrugated sheets 260, 262. The concave portions of the first and second corrugated sheets 260, 262 cooperate to form an opening 264. While only one opening 264 is shown in FIG. 2 for the purposes of simplicity and clarity, it may be noted additional sheets may be employed to provide additional openings. For an airflow traveling generally from left to right and from the back to the front of the page as seen in FIG. 2, it may be noted that air (or other fluid) may enter the opening 264 via a first entry path 270 and/or a second entry path 272, and that air (or other fluid) may exit via a first exit path 280 and/or a second exit path 282. Various entry and exit paths of openings formed by different sheets may cooperate to define pathways through the core assembly 250 through which air (or other fluid) may pass. Again, some of the pathways may be in fluid communication with the inlet and outlet corresponding to the flow of fluid to be cooled, while other pathways may be in fluid communication with a cooling flow. It may be noted that the sheets of the core assembly 250 depicted in FIG. 2 are shown at 90 degrees, but that other angles or arrangements may be provided in other embodiments. It may also be noted that the particular shapes of the bends in the corrugated sheets and arrangement of sheets depicted in FIG. 2 are intended by way of example, and that other shapes or corrugations may be employed additionally or alternatively in various embodiments.

Returning to FIG. 1, as indicated herein, one or more portions of the heat exchanger assembly 100 (e.g., the core 125) may be comprised of a relatively light weight, high temperature material having a relatively low thermal conductivity. Conventionally, materials with relatively high thermal conductivity may be considered desirable for use in heat exchangers, while materials with relatively low thermal conductivity may be considered as "insulators" and undesirable for use in heat exchangers. However, in various embodiments, the loss of efficiency based on conductivity of heat exchanger material may be found to become less significant as the efficiency of the type of heat exchange is reduced, and benefits of lower weight, improved temperature performance, or the like may outweigh any loss of efficiency in certain environments or applications.

For example, liquid-to-liquid heat exchange (e.g., the cooling fluid is liquid and the fluid to be cooled is liquid) may be understood as generally more efficient than gas-to-liquid heat exchange, and gas-to-liquid heat exchange may be understood as generally more efficient than gas-to-gas heat exchange. Thus, the benefit of using a high thermal conductivity heat exchanger material may be greater for liquid-to-liquid heat exchange than for gas-to-liquid or gas-to-gas heat exchange. Put another way, in various embodiments, the efficiency "penalty" incurred by a low thermal conductivity material is less significant for gas-to-gas heat exchange than for liquid-to-liquid heat exchange. Various embodiments employ materials with thermal conductivities conventionally considered unacceptable for heat exchangers, for example, in generally less efficient heat exchange applications (e.g., air-to-air heat exchange) to benefit from properties of certain materials (e.g., light weight, high temperature performance) while reducing, minimizing, or eliminating the effects of any heat exchange efficiency loss.

For example, metals such as copper, aluminum, or the like (or materials with comparable thermal conductivity) may conventionally be considered as preferred materials for heat exchangers. However, in various embodiments, one or more portions of the heat exchanger assembly 100 (e.g., the core 125) may be comprised from a material or materials having relatively low thermal conductivities. For example, titanium is a metal that may be used in heat exchangers in high temperature environments where aluminum may be inappropriate. In various embodiments, the core 125 may be made of a material having a lower thermal conductivity than titanium. In various embodiments, the core 125 may be made of a material having a substantially lower thermal conductivity than titanium. For example, the core 125 may be made of a material having a thermal conductivity that is less than half of the thermal conductivity of titanium.

In various embodiments, the core 125 may be made from a geopolymer (or non-organic polymer) or a composite including one or more geopolymers. For example, polysialate may be utilized in various embodiments. Geopolymers as used herein may be understood to include non-organic polymers, or polymers based on a material other than carbon. For example, a geopolymer may be silicon based. In various embodiments, a geopolymer resin (e.g., a polysialate resin) may be paired with carbon fibers using commercially available methods (e.g., prepreg, vacuum bag, or the like) to form the core 125 (e.g., to form a corrugated structure with passageways). Thus, a carbon reinforced geopolymer may be utilized in making the core 125. By way of example, sheets formed of the carbon reinforced geopolymer (e.g., corrugated or otherwise shaped sheets) may be joined, with corrugations or other features of adjacent or adjoining sheets cooperating to form passageways or openings.

In various embodiments, geopolymer composites may be employed to provide low weight and/or high temperature capabilities. For example, in various embodiments, the core 125 may be comprised of a geopolymer composite that may be utilized in environments of 600 degrees Celsius or above. For example, a geopolymer composite utilized in some embodiments may maintain about 63% of a room temperature strength at about 600 degrees Celsius. In various embodiments, the core 125 may be comprised of a geopolymer composite that may be utilized in environments of 800 degrees Celsius or above, or, as another example, in environments of 1000 degrees Celsius or above. Further, geopolymer composites in various embodiments may be readily usable to form the core 125. For example, geopolymer composites utilized in forming the core 125 may cure at a relatively low temperature (e.g., from about 20 to about 150 degrees Celsius in some embodiments), and may use fabrication equipment and techniques employed for traditional organic composites, such as epoxy reinforced with carbon fibers. In various embodiments, geopolymer composites may be resistant to substances such as kerosene, acetone, hydrogen chloride, or the like, and may not experience substantial loss of strength after exposure to such substances. Further still, geopolymer composites may be integrated with traditional organic composites in various embodiments. Further still, in various embodiments, the material used for the core 125 may also be used for (or may match in terms of thermal expansion) an object or structure proximate to the heat exchanger assembly 100 (e.g., a nacelle of an aircraft) to minimize or eliminate any effects of varying thermal expansion between the heat exchanger assembly 100 and the surroundings of the heat exchanger assembly 100.

The table below depicts example thermal conductivity of various materials, including a geopolymer composite.

| Material | In-plane thermal conductivity (watts/(meter * degree Kelvin)) | Thru-plane thermal conductivity (watts/(meter * degree Kelvin)) | Density (Kilograms/meter$^3$) |
|---|---|---|---|
| Geopolymer reinforced with carbon fiber | 6-10 | 0.7-1 | 1800 |
| Aluminum | 147 | 147 | 2700 |
| Epoxy reinforced with carbon fiber | 10-20 | 0.7-1 | 1800 |
| Titanium | 22 | 22 | 4400 |
| Inconel | 12 | 12 | 8190 |

Thus, it can be seen that the geopolymer composite is substantially less dense than titanium or aluminum. Further, it may be noted that the thermal conductivity of the geopolymer composite is generally the lowest of the materials listed. Additionally, the through-plane thermal conductivity of the geopolymer composite may be substantially lower than the in-plane thermal conductivity. The core 125 (e.g., sheets formed of geopolymer composite used to form the core 125) may be configured and manufactured to align the fibers of the geopolymer composite to minimize the effect of the lower through-plane thermal conductivity. For example, the core 125 may be designed and constructed to increase and/or maximize the heat transferred through the core 125 via in-plane conduction through the geopolymer composite. It should be noted that the values presented in the table are approximate and intended for the purpose of illustration. For example, other materials having different qualities or characteristics may be employed in various alternate embodiments.

As indicated herein, the effect or penalty of a lower thermal conductivity (e.g., for a material such as a geopolymer composite) may be reduced or minimized relative to a higher conductivity material for less efficient heat transfer mechanisms, such as gas-to-liquid (e.g., air-to-oil) or gas-to-gas (e.g., air-to-air) cooling. The table below compares the effectiveness (relative to the effectiveness of aluminum) of various materials. For the example scenarios in the table below, a model was constructed using a brick-type air-to-oil cooler, with operating and modeling parameters (other than material) maintained for the various example scenarios.

| Material | Effectiveness | Normalized Weight |
|---|---|---|
| Composite (k = 1 W/(m * K.)) | 0.45 | 0.67 |
| Composite (k = 10 W/(m * K.)) | 0.68 | 0.67 |
| Aluminum | 1.00 | 1.00 |
| Composite (k = 10 W/(m * K.) for fins; k = 1 W/(m * K.) for plate) | 0.68 | 0.67 |
| Composite (k = 20 W/(m * K.) for fins) | 0.78 | 0.67 |
| Titanium alloy (110 AT) | 0.65 | 1.64 |

It may be noted that the particular brick-style cooler modeled for the above table was designed for an aluminum cooler, so that various design changes to the cooler may result in improved relative effectiveness for the geopolymer composites represented in the example scenarios. It should be noted that the above table is intended by way of illustration only, and that different effectiveness measures may be achieved using different heat exchanger designs, different operating parameters, or different measurement or modeling techniques, among others. Generally, the results represented in the table above may be seen to indicate that the relatively low thermal conductivity of various geopolymer composites may result in lower heat exchange effectiveness than aluminum (or similar or lower than titanium), but may provide weight benefits with respect to aluminum and titanium. Further, the composites represented in the table may be usable at elevated temperatures unsuitable for aluminum. It may be noted that an additional amount of a geopolymer may be required for a given application for structural integrity than, for example, titanium. However, because the composite may, in various embodiments, be less than half the density of titanium, substantial overall weight benefits may still be obtained.

The table below compares the effectiveness (relative to the effectiveness of aluminum) of an example geopolymer composite relative to titanium in an air-to-air application. For the example scenarios in the table below, a model was constructed using a brick-type cooler, with operating and modeling parameters (other than material) maintained for the various example scenarios.

| Material | Effectiveness | Normalized Weight |
|---|---|---|
| Composite (k = 10 W/(m * K.)) | 0.87 | 0.40 |
| Titanium alloy (110 AT) | 0.85 | 0.98 |
| Titanium | 1.00 | 1.00 |

Again, it should be noted that the above table is intended by way of illustration only, and that different effectiveness measures may be achieved using different heat exchanger designs, different operating parameters, or different measurement or modeling techniques, among others. Generally, the results represented in the table above may be seen to indicate that the relatively low thermal conductivity of various geopolymer composites relative to titanium may result in no diminishment of effectiveness or a low diminishment of effectiveness in certain applications. For instance, the example thermal conductivity corresponding to a geopolymer composite results in 87% heat exchange effectiveness relative to titanium for the given scenario, and a slightly increased effectiveness relative to a titanium alloy. It may be noted that an additional amount of a geopolymer may be required for a given application for structural integrity than, for example, titanium. However, because the composite may, in various embodiments, be less than half the density of titanium, substantial overall weight benefits may still be obtained. For instance, for the example scenario represented in the table above, the density of the composite is about 40% of the density of titanium. Again, it should be noted that the above and preceding table are intended for the purposes of illustration of various relative properties and resulting effectiveness of geopolymer composites relative to various metals. Different results may be obtained by varying materials, geometries, temperatures or other operating conditions, measurement or modeling techniques, or the like. For example, it is believed that improved effectiveness for various designs may be obtained by advantageous alignment of fibers in a geopolymer composite to increase or maximize heat transfer via in-plane conduction versus through-plane conduction.

Generally, in various embodiments, utilization of a high temperature (but low conductivity) composite may provide substantial weight benefits (and/or temperature behavior) relative to conventional heat exchanger materials such as aluminum or titanium. For example, aluminum may not be suitable for high temperature environments (e.g., 300 degrees Celsius, 600 degrees Celsius, 800 degrees Celsius, 1000 degrees Celsius). For example, a geopolymer composite core may provide about a 20% to about 30% weight reduction compared to aluminum and be suitable for high temperature applications, which may provide sufficient benefit to outweigh any loss in heat exchange efficiency in certain applications. As another example, for air-to-air heat exchangers, a geopolymer composite core may provide similar heat exchange effectiveness while providing a weight reduction of about 50% to about 60% compared to titanium. Further still, use of geopolymer composites may provide an additional benefit in terms of matching the thermal expansion of existing composite structures, such as nacelles used in aircraft, thereby reducing potential effects of thermal expansion mismatch. For example, in an aircraft applications (e.g., in conjunction with a turbofan), weight may be at a premium, and a heat exchanger may be exposed to high temperatures. Further, a ready supply of cooling flow may be available, for example, from a bypass flow of a turbofan. The low weight, high temperature capability, and low drag of a primary surface air-to-air (e.g., corrugated) heat exchanger assembly formed in accordance with various embodiments may provide significant or substantial benefits (e.g., relative to heat exchangers made from conventional materials having higher thermal conductivities) in such applications, for example.

Figure 3:
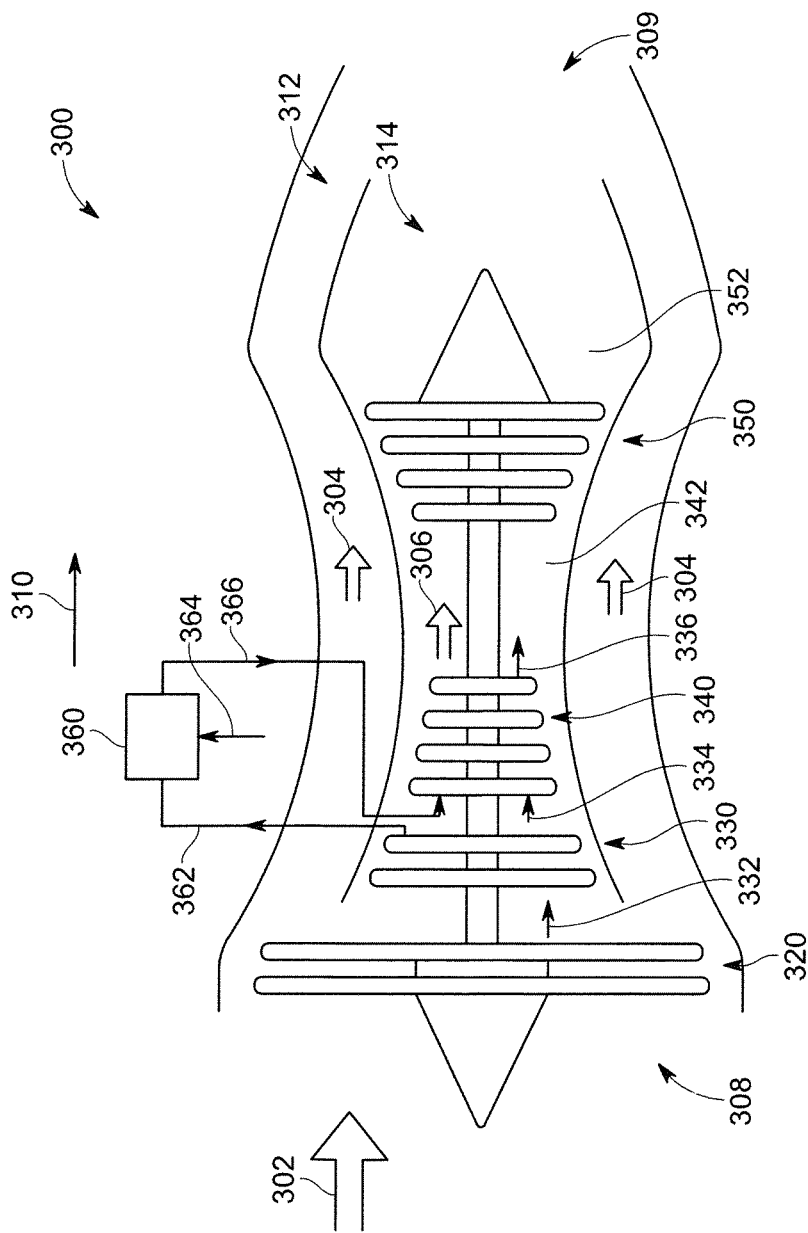
FIG. 3 is a schematic view of a turbofan assembly including an intercooler in accordance with various embodiments.

For example, FIG. 3 illustrates a turbofan assembly 300 formed in accordance with various embodiments. The turbofan assembly 300 includes a fan portion 320, a first compressor 330 (or low pressure compressor), a second compressor 340 (or high pressure compressor), a turbine portion 350, and a nozzle 352. For example, one or more of the fan portion 320, first compressor 330, second compressor 340, and turbine portion 350 may comprise plural vanes or blades radially disposed about a shaft. Power generated using the turbofan assembly 300 (e.g., via the combustion of a fuel mixed with air) may be used to provide propulsion to an aircraft (e.g., via the fan portion 320).

Generally, in various embodiments, the turbofan assembly 300 receives an intake flow 302 proximate an intake side 308 in a downstream direction 310. The downstream direction 310 may be understood as proceeding generally from the intake side 308 to an exit or exhaust side 309 of the turbofan assembly 310. The turbofan assembly 300 depicted in FIG. 3 includes a bypass portion 312 and a combustion portion 314. Air that is passed through the combustion portion 314 is utilized to combust a gas, while air not used for combustion is passed through the bypass portion 312, for example to provide propulsion via the fan portion 320. The intake flow 302 may be separated into a combustion flow 306 that passes through the combustion portion 314 and a bypass flow 304 that passes through the bypass portion 312. In some embodiments, the bypass flow 304 may receive between about 8 to about 10 times the amount of the intake flow 302 as the combustion flow 306.

Generally, the first compressor 330 and second compressor 340 are used to increase the pressure of the combustion flow 306. The combustion flow 306 is then combusted in the combustion chamber 342 and passed through the turbine section 350 and exhaust 352. In the illustrated embodiment, the turbofan assembly 300 includes an intercooler assembly 360 operatively disposed between the first compressor 330 and the second compressor 340 (e.g., downstream of the first compressor 330 and upstream of the second compressor 340), and configured to cool a flow of air that has been compressed by the first compressor 330 and is to be further compressed by the second compressor 340. The intercooler assembly 360 may be configured generally similarly to the heat exchanger assembly 100 discussed herein in connection with FIG. 1. For example, a flow provided by the first compressor 330 may enter the inlet (e.g., the inlet 110) of the intercooler and exit the outlet (e.g., the outlet 120) from where the flow enters the second compressor 340. A cooling flow (e.g., the cooling flow 106) may be obtained from the bypass flow 304. For example, ducting or the like may be configured to divert or provide a portion of the bypass flow 304 as a cooling flow to pass through a core (e.g., the core 125) of the intercooler assembly 360. As another example, a receiving surface of the intercooler assembly 360 may be disposed in the bypass portion 312 and oriented to receive a portion of the bypass flow 304. The core of the intercooler assembly 360 may be configured to reduce or minimize drag experienced by the bypass flow 304.

In the illustrated embodiment, the first compressor 330 receives a first intake airflow 332 and provides a first exit airflow 334 at a higher pressure than the first intake airflow 332. All or a portion of the first exit airflow 334 are directed via an intercooler intake path 362 to the intercooler 360. The intercooler intake path 362 may include ducting, hosing, or the like configured to direct flow from the combustion portion 314 (e.g., from an outlet of the first compressor 340) to the inlet of the intercooler assembly 360. Also, a portion of the bypass flow 304 is directed via a cooling path 364 to the intercooler assembly 360. The cooling path 364 may include ducting, hosing, or the like configured to direct flow from the bypass portion 312 to the receiving surface of the intercooler assembly 360. A return path (not shown) may return to the bypass portion 312 flow that has passed from the bypass portion 312 through the core of the intercooler assembly 360. As the flow from the first exit airflow 334 passes through the intercooler assembly 360, the flow from the first exit airflow 334 is cooled via heat exchange with a cooling flow provided via the cooling path 364 from the bypass flow 306. The cooled flow is then directed to the second compressor 340 via the intercooler exit path 366. The intercooler exit path 366 may include ducting, hosing, or the like configured to direct flow from the outlet of the intercooler assembly 360 to the combustion portion 314 (e.g., to an inlet of the second compressor 340). Thus, the intercooler assembly 360 of the embodiment depicted in FIG. 3 is configured to receive the first exit airflow 334 and to cool the first exit airflow 334 to provide a cooled airflow to the second compressor 340, which receives the cooled airflow from the intercooler assembly 360 and provides a second exit airflow 336 at a higher pressure than the cooled airflow or first exit airflow 334.

It may be noted that the particular arrangement depicted in FIG. 3 is meant by way of example and that other arrangements may be employed in various alternate embodiments. For example, varying numbers of compressors or arrangements of compressors may be used in various embodiments. Additionally or alternatively, a heat exchanger formed in accordance with various embodiments may be placed at one or more other locations and/or used for other purposes in connection with the turbofan assembly 300. For example, a heat exchanger may be configured as a recuperator and configured to receive an airflow from the exhaust 352 of the turbofan assembly 300.

It should be noted that the above discussed embodiments of FIGS. 1-3 are provided by way of example and not limitation, as various components or aspects (including shapes, dimensions, or the like) of the above example embodiments may be modified, combined, added, removed, or re-arranged to form additional embodiments.

Figure 4:
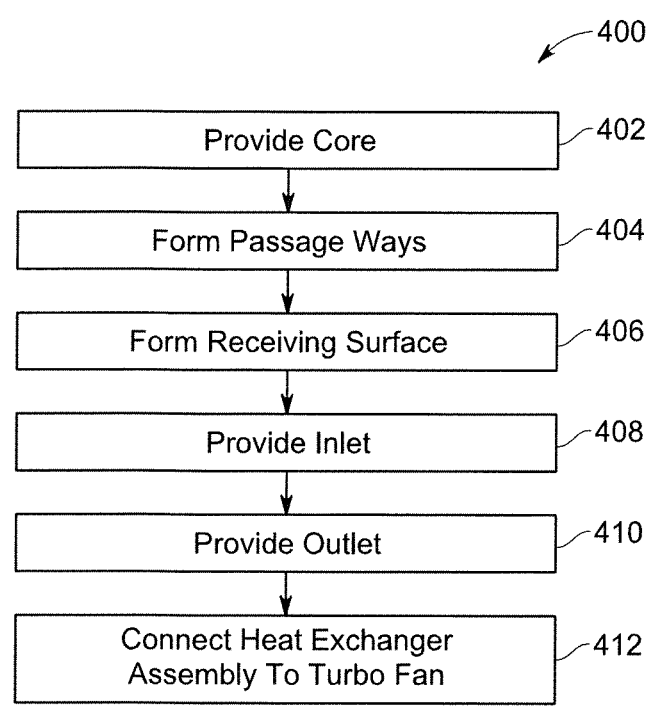
FIG. 4 is a flowchart of a method for providing a heat exchanger assembly in accordance with various embodiments.

FIG. 4 is a flow chart of a method 400 for providing a heat exchanger assembly (e.g., a relatively lightweight heat exchanger assembly suitable for use at relatively high temperatures). The method 400, for example, may employ structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 402, a core (e.g., the core 125) for a heat exchanger assembly is provided. For example, the core may be constructed using a geopolymer or a composite including one or more geopolymers. For example, polysialate may be utilized in various embodiments. For example, sheets of a carbon reinforced geopolymer that are corrugated or otherwise shaped sheets may be provided and joined, with corrugations or other features of adjacent or adjoining sheets cooperating to form passageways or openings. The sheets may be cured at relatively low temperatures using conventional composite forming techniques as discussed herein.

At 404, passageways are formed. The passageways, for example, may be formed by openings defined between corrugations, bends, or other shapes in adjacent or adjoining sheets. For example, adjoining sheets may be generally aligned so that openings defined by corresponding corrugations or bends extend substantially along the entire length of adjoining sheets, thereby defining passageways that extend substantially along the entire length of adjoining sheets. In other embodiments, passageways may not extend substantially along the entire length of adjoining sheets. In various embodiments, other arrangements, such as cross-corrugation (e.g., corrugated surfaces arranged in a non-parallel arrangement or alignment), may be employed.

At 406, a receiving surface is formed. For example, the receiving surface may be formed as a surface or plane defining the edges of one or more sheets used to form the core. Thus, in some embodiments, at least a portion of the openings formed between the bends or other shapes in adjacent or adjoining surface may be open at the receiving surface and open or generally unobstructed through the core, allowing a cooling flow to pass through the core.

At 408, an inlet is provided. For example, the inlet may be configured to accept a conduit, hosing, ducting, or the like configured to provide a flow of a fluid (e.g., air to be cooled. The inlet may also be configured for fluid communication with a portion or group of the passageways formed at 404, via one or more of a header, ducting, gaskets, seals, or the like. At 410, an outlet is provided. For example, the outlet may be configured to mate with a conduit, hosing, ducting, or the like configured to provide a cooled flow of the fluid previously accepted via the inlet. The outlet may also be configured for fluid communication with the same portion or group of the passageways formed at 404 as the inlet, via one or more of a header, ducting, gaskets, seals, or the like. Any passageways used for fluid communication with the inlet and outlet in various embodiments may be sealed, blocked, or otherwise configured to prevent entry of air or other fluid from the receiving surface. Thus, a first group of the passageways may be in fluid communication with the inlet and outlet, but not in fluid communication with the receiving surface. A second group of the passageways (e.g., a group of passageways arranged in an alternating fashion with the first group of the passageways) may be in fluid communication with the receiving surface, but not with the inlet and outlet. Thus a first flow may be passed through the inlet to the outlet and cooled by a second flow passed through the core via the receiving surface without mixing the first and second flows.

At 412, the heat exchanger assembly is operably connected to a turbofan. For example, in embodiments where the heat exchanger assembly is configured to be employed as an intercooler, the inlet of the heat exchanger assembly may be operably connected to an outlet of a first compressor, the outlet of the heat exchanger assembly may be connected to an inlet of a second compressor disposed downstream of the first compressor, and the heat exchanger assembly may be positioned in a bypass duct or otherwise operably connected to receive a cooling flow from a bypass duct of the turbofan. In various embodiments, other arrangements may be employed. For example, in embodiments where a heat exchanger assembly is configured for use as a recuperator, the inlet of the heat exchanger assembly may be operably connected to receive a portion of an exhaust flow of a turbofan.

Thus, various embodiments provide for improved heat exchangers. Relatively low thermal conductivity materials, such as geopolymers or geopolymer based composites may be utilized, for example, to form air-to-air heat exchangers in various embodiments. For example, lightweight heat exchangers suited for use in relatively high temperature environments may be provided. In various embodiments, a heat exchanger may be provided for use with an intercooler and/or other aspect of a turbofan or other turbine engine.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A heat exchanger assembly comprising:
   an inlet configured to accept a fluid to be cooled;
   an outlet configured to provide an exit for a flow of the fluid that has been cooled; and
   a core, the core comprising:
      at least one passageway formed therein configured for passage of the fluid to be cooled from the inlet to the outlet; and
      a cooling surface configured to receive a cooling flow therethrough, the core configured to direct the cooling flow to pass by at least a portion of the at least one passageway to cool the fluid,
   wherein the core is comprised of a high temperature geopolymer composite material, the high temperature geopolymer composite material configured for use at temperatures above about 300 degrees Celsius, the high temperature geopolymer composite material having a thermal conductivity below about 20 Watts/(meter*degree Kelvin), wherein the high temperature geopolymer composite material has an in-plane thermal conductivity of about 10 Watts/(meter*degree Kelvin) or lower and a through-plane thermal conductivity of about 1 Watts/(meter*degree Kelvin) or lower.

2. The assembly of claim 1, wherein the at least one passageway and the cooling surface are formed by corrugations in the core.

3. An assembly for a turbofan comprising:
   a first compressor configured to receive a first intake airflow and to provide a first exit airflow at a higher pressure than the first intake airflow;
   an intercooler disposed downstream of the first compressor and configured to receive the first exit airflow and to cool the first exit airflow to provide a cooled airflow, the intercooler comprising:
      an inlet configured to accept a fluid to be cooled;
      an outlet configured to provide an exit for a flow of the fluid that has been cooled; and
      a core comprising:
         at least one passageway formed therein configured for passage of the fluid to be cooled from the inlet to the outlet; and
         a cooling surface configured for reception of a cooling flow therethrough, the core configured to direct the cooling flow to pass by at least a portion of the at least one passageway to cool the fluid,
         wherein the core is comprised of a high temperature geopolymer composite material, the high temperature geopolymer composite material configured for use at temperatures above about 300 degrees Celsius, the high temperature geopolymer composite material having a thermal conductivity below about 10 Watts/(meter*degree Kelvin); and
   a second compressor configured to receive the cooled airflow from the intercooler and to provide a second exit airflow at a higher pressure than the cooled airflow, wherein the high temperature geopolymer composite material has an in-plane thermal conductivity of about 10 Watts/(meter*degree Kelvin) or lower and a through-plane thermal conductivity of about 1 Watts/(meter*degree Kelvin) or lower.

4. The assembly of claim 3, wherein the at least one passageway and the cooling surface are formed by corrugations in the core.

5. A method comprising:
   providing a core comprising;
      at least one passageway formed therein; and
      a cooling surface configured to receive a cooling flow therethrough, the core configured to direct the cooling flow to pass by at least a portion of the at least one passageway to cool a fluid passing through the at least one passageway,
      wherein the core is comprised of a high temperature geopolymer composite material, the high temperature geopolymer composite material configured for use at temperatures above about 300 degrees Celsius, the high temperature geopolymer composite material having a thermal conductivity below about 10 Watts/(meter*degree Kelvin);
   providing an inlet in fluid communication with the at least one passageway, the inlet configured to accept the fluid to be cooled; and,
   providing an outlet in fluid communication with the at least one passageway of the core, the outlet configured to provide an exit for a flow of the fluid that has been cooled, wherein the high temperature geopolymer composite material has an in-plane thermal conductivity of about 10 Watts/(meter*degree Kelvin)) or lower and a through-plane thermal conductivity of about 1 Watts/(meter*degree Kelvin) or lower.

6. The assembly of claim 1, wherein the inlet is configured to accept a flow of air to be cooled and wherein the cooling surface is configured for passage therethrough of a cooling air flow, wherein the assembly is configured for an air-to-air heat exchange.

7. The assembly of claim 6, wherein the cooling surface is configured for passage of the cooling air flow therethrough from a bypass flow of a turbofan.

8. The assembly of claim 1, wherein the flow of the fluid that has been cooled is configured to be provided to a compressor located in a downstream direction from the assembly.

9. The assembly of claim 8, wherein the inlet is configured to accept the fluid to be cooled from a compressor located in an upstream direction from the assembly.

10. The assembly of claim 1, wherein the high temperature geopolymer composite material is configured for use at temperatures above about 600 degrees Celsius.

11. The assembly of claim 3, wherein the cooling surface is configured for passage therethrough of a cooling air flow, wherein the assembly is configured for an air-to-air heat exchange.

12. The assembly of claim 11, wherein the cooling surface is configured for passage of the cooling air flow therethrough from a bypass flow of the turbofan.

13. The assembly of claim 3, wherein the high temperature geopolymer composite material is configured for use at temperatures above about 600 degrees Celsius.

14. The method of claim 5, further comprising forming the at least one passageway and the cooling surface with, corrugations in the core.

15. The method of claim 5, wherein the cooling surface is configured for passage of the cooling air flow therethrough from a bypass flow of a turbofan.

16. The method of claim 5, wherein the flow of the fluid that has been cooled is configured to be provided to a compressor located in a downstream direction from the assembly.

17. The method of claim 16, wherein the high temperature geopolymer composite material is configured for use at temperatures above about 600 degrees Celsius.

* * * * *